United States Patent
Lee et al.

(10) Patent No.: US 9,572,088 B2
(45) Date of Patent: Feb. 14, 2017

(54) METHOD FOR TRANSCEIVING ACCESSIBLE CELL INFORMATION OF A RELAY NODE IN A WIRELESS COMMUNICATION SYSTEM, AND DEVICE FOR SAME

(75) Inventors: Young Dae Lee, Anyang-si (KR); Sung Hoon Jung, Anyang-si (KR); Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 18 days.

(21) Appl. No.: 13/581,604

(22) PCT Filed: Mar. 28, 2011

(86) PCT No.: PCT/KR2011/002104
§ 371 (c)(1),
(2), (4) Date: Aug. 28, 2012

(87) PCT Pub. No.: WO2011/122808
PCT Pub. Date: Oct. 6, 2011

(65) Prior Publication Data
US 2012/0327841 A1 Dec. 27, 2012

Related U.S. Application Data

(60) Provisional application No. 61/318,368, filed on Mar. 28, 2010.

(51) Int. Cl.
*H04W 36/00* (2009.01)
*H04W 48/08* (2009.01)
(Continued)

(52) U.S. Cl.
CPC ............. *H04W 48/08* (2013.01); *H04W 36/00* (2013.01); *H04W 48/16* (2013.01); *H04W 76/02* (2013.01); *H04W 88/04* (2013.01)

(58) Field of Classification Search
None
See application file for complete search history.

(56) References Cited

U.S. PATENT DOCUMENTS 7,333,438 B1 * 2/2008 Rabie ................. H04L 41/0654
370/216
7,917,121 B2 * 3/2011 Kim et al. ................. 455/343.2
(Continued)

OTHER PUBLICATIONS

H. Lin, et al., "Capacity Analysis of Dedicated Fixed and Mobile Relay in LTE-Advanced Cellular Networks", 2009 IEEE International Conference on Communications Technology and Applications (ICCTA '09), pp. 354-359, Oct. 18, 2009.

*Primary Examiner* — Hassan Phillips
*Assistant Examiner* — Ayanah George
(74) *Attorney, Agent, or Firm* — Dentons US LLP

(57) ABSTRACT

The present invention discloses a method for a serving network node to process a signal in a wireless communication system. In more detail, the method comprises the steps of: forming a communication link with a mobile device; receiving a message including network node list information that the mobile device can access from an external network node or from the mobile device; and transceiving a signal with the mobile device. Here, the mobile device is a relay node, and the external network node is an operation and maintenance (OAM) server or mobility management entity (MME).

3 Claims, 12 Drawing Sheets

(51) Int. Cl.
*H04W 48/16* (2009.01)
*H04W 76/02* (2009.01)
*H04W 88/04* (2009.01)

(56) References Cited

U.S. PATENT DOCUMENTS

| | | | |
|---|---|---|---|
| 2007/0105558 A1* | 5/2007 | Suh et al. ............... | 455/436 |
| 2008/0200169 A1* | 8/2008 | Gao ........................ | 455/434 |
| 2008/0244134 A1* | 10/2008 | Hosomi et al. ......... | 710/200 |
| 2008/0318574 A1* | 12/2008 | Bi ............... | H04W 36/0061 |
| | | | 455/436 |
| 2009/0258639 A1 | 10/2009 | Nyström et al. | |
| 2009/0285182 A1* | 11/2009 | Zou et al. ............... | 370/331 |
| 2010/0061339 A1* | 3/2010 | Kim ............. | H04W 36/0005 |
| | | | 370/331 |
| 2010/0062774 A1* | 3/2010 | Motegi et al. .......... | 455/437 |
| 2010/0317315 A1* | 12/2010 | Burbidge ....... | H04W 36/0022 |
| | | | 455/404.1 |

\* cited by examiner (a) Control-plane protocol stack (b) User-plane protocol stack

METHOD FOR TRANSCEIVING ACCESSIBLE CELL INFORMATION OF A RELAY NODE IN A WIRELESS COMMUNICATION SYSTEM, AND DEVICE FOR SAME

This Application is a 35 U.S.C. §371 National Stage Entry of International Application No. PCT/KR2011/002104, filed Mar. 28, 2011 and claims the benefit of U.S. Provisional Application No. 61/318,368, filed Mar. 28, 2010, both of which are incorporated by reference in their entirety herein.

TECHNICAL FIELD

The present invention relates to a wireless communication system, and more particularly, to a method of transceiving an accessible cell information of a relay node in a wireless communication system and apparatus therefor.

BACKGROUND ART

3GPP LTE ($3^{rd}$ generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE OF THE INVENTION

Technical Problem

Based on the above-mentioned discussion, a method of transceiving an accessible cell information of a relay node in a wireless communication system and apparatus therefor shall be proposed in the following description.

Technical Solution

To achieve these and other advantages and in accordance with the purpose of the present invention, as embodied and broadly described, a method of processing a signal, which is processed by a serving network node in a wireless communication system, according to one embodiment of the present invention may include the steps of establishing a communication link with a mobile device, receiving a message including network node list information on a list of network nodes accessible by the mobile device from an external network node or the mobile device, and transceiving the signal with the mobile device. In particular, the mobile device may include a relay node and the external network node may include either an OAM (operation and maintenance) server or an MME (mobility management entity).

Preferably, the step of establishing the communication link with the mobile device may include the step of transmitting an identifier of the mobile device to the external network node.

Preferably, the method may further include the steps of transmitting a handover request message to a target network node included in the network node list, receiving a handover request response message from the target network node, and transmitting a handover command message to the mobile device. More preferably, the handover request message may include the network node list information.

Preferably, the method may further include the step of if a failure occurs in the communication link between the mobile device and the serving network node, transmitting a release message to release the communication link to the mobile device, wherein the release message includes the network node list information. More preferably, the release message may include an operating frequency information of the network node included in the network node list information and RAT (radio access technology) information. More preferably, the mobile device having received the release message may release the communication link between the serving network node and the mobile device and may then transmit a communication link connection request message to a target network node included in the network node list information.

Advantageous Effects

According to an embodiment of the present invention, a network node, e.g., a donor cell is able to efficiently manage a relay node by receiving an accessible cell list of the relay node.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

BEST MODE FOR INVENTION

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

Figure 1:
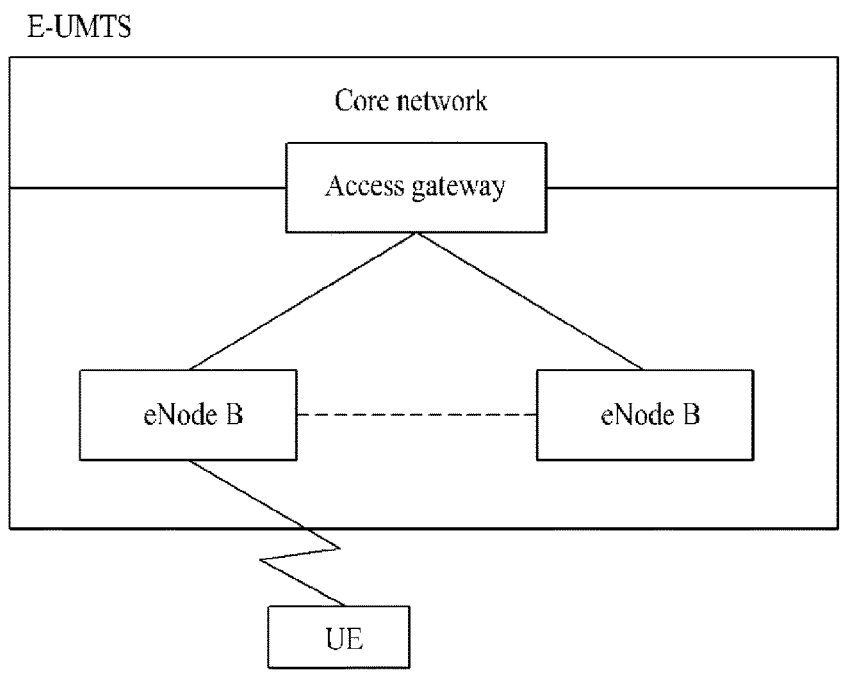
FIG. 1 is a schematic diagram of E-UMTS network structure as an example of a mobile communication system.
Figure 2:
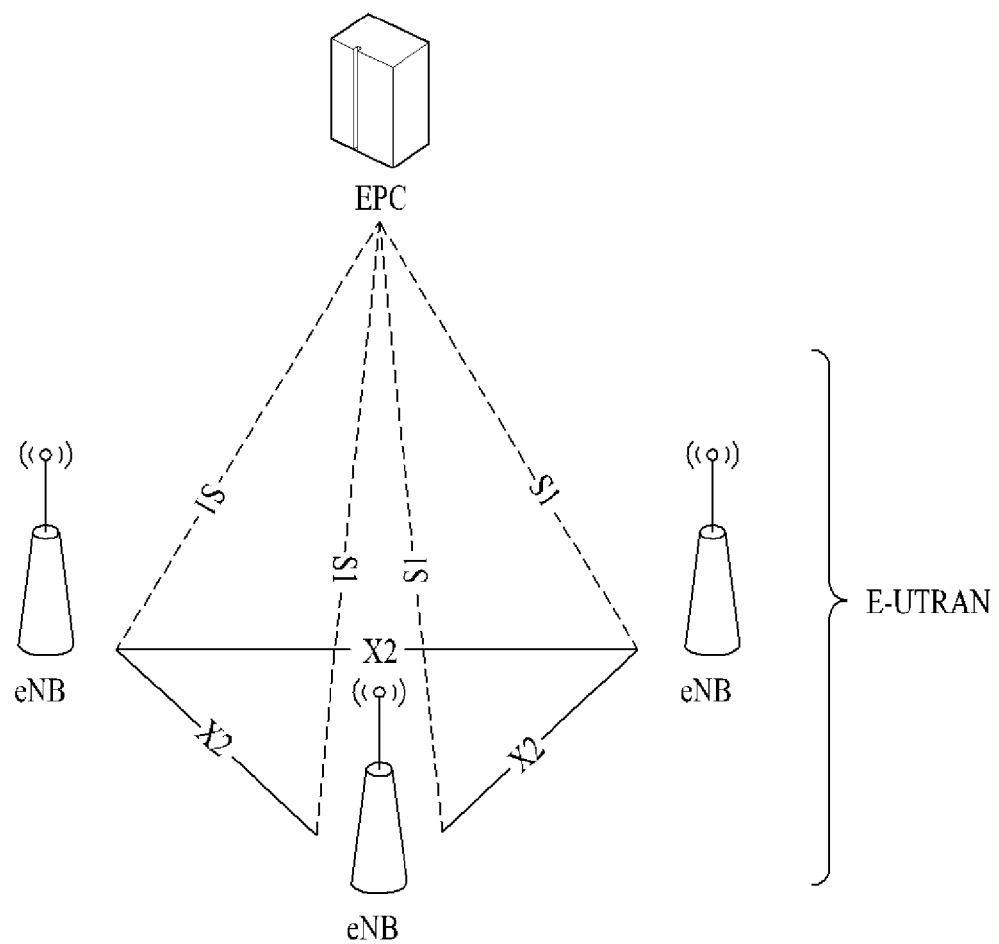
FIG. 2 is a conceptional diagram of a network structure of E-UTRAN (evolved universal terrestrial radio access network).

FIG. 2 is a conceptional diagram of a network structure of E-UTRAN (evolved universal terrestrial radio access network). In particular, the E-UTRAN system is the system evolved from a conventional UTRAN system. The E-UTRAN includes cells (e.g., eNBs). And, the cells are connected via an X2 interface with each other Each of the cell is connected to a user equipment via a radio interface and is also connected to an evolved packet core (EPC) via an S1 interface.

The EPC includes MME (Mobility Management Entity), S-GW (Serving-Gateway) and PDN-GW (Packet Data Network-Gateway). The MME has an information of a user equipment or an information on capability of the user equipment. Such information is mainly used for management of mobility of the user equipment. The S-GW is a gateway having the E-UTRAN as a terminal end point. And, the PDN-GW is a gateway having a packet data network (PDN) as a terminal end point.

Figure 3:
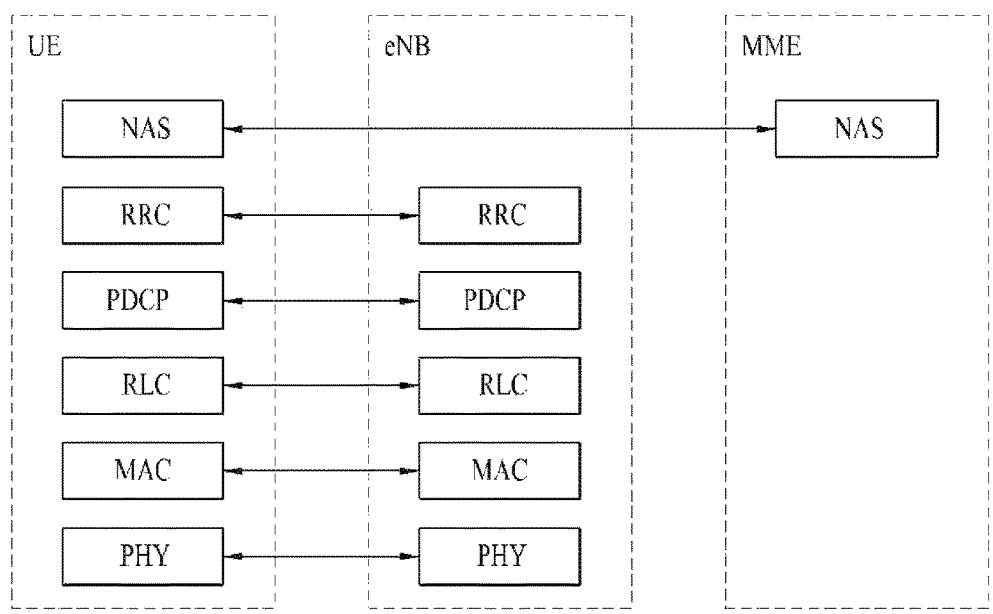
FIG. 3 is a diagram of structures of control and user planes of a radio interface protocol between a user equipment and E-UTRAN based on 3GPP radio access network specification.
Figure 3:
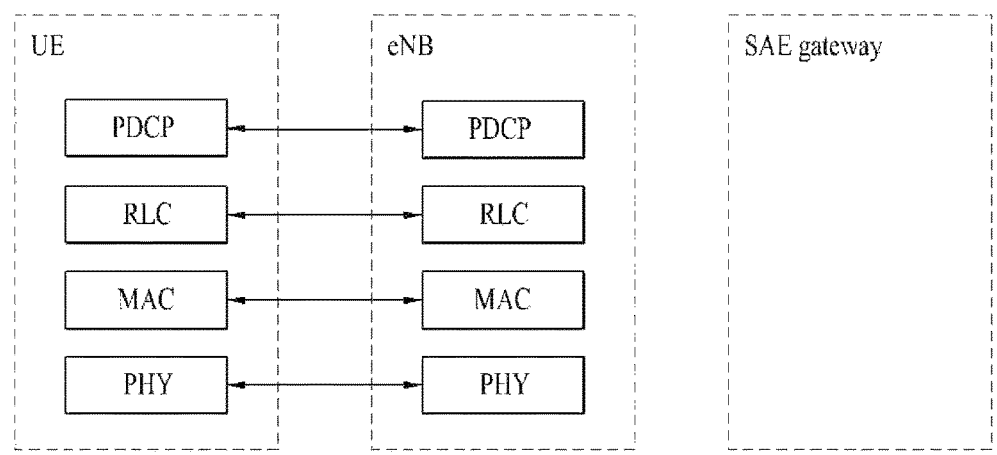

FIG. 3 is a diagram of structures of control and user planes of a radio interface protocol between a user equipment and E-UTRAN based on 3GPP radio access network specification. First of all, a control plane means a passage for transmitting control messages used by a user equipment and a network to mange a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer o the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network.

One cell, which constructs a base station (eNB), is set to one of bandwidths including 1.25 MHz, 2.5 MHz, 5 MHz, MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH).

Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 4:
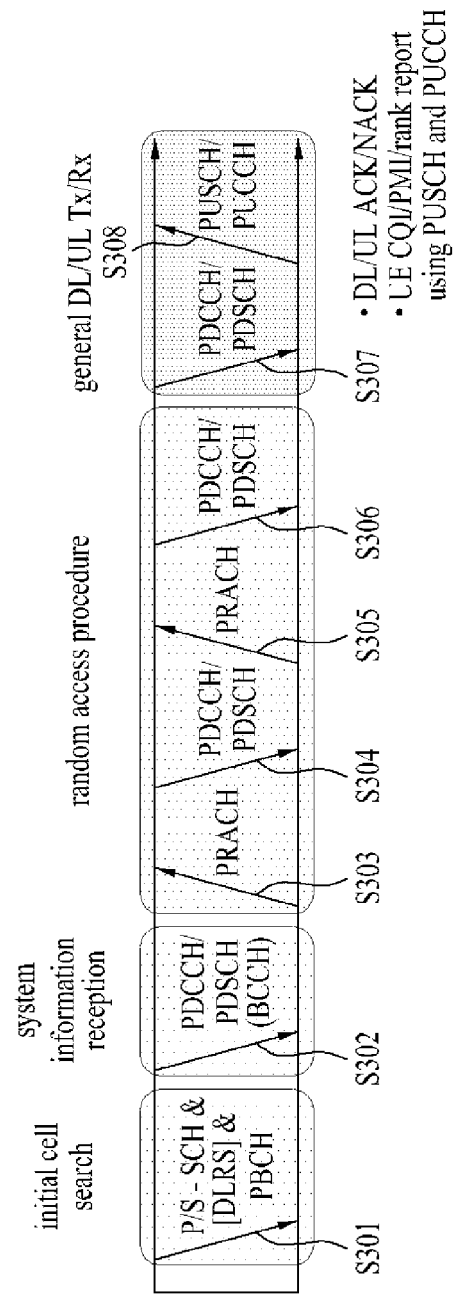
FIG. 4 is a diagram for explaining physical channels used for 3GPP system and a general method of transmitting a signal using the same.

FIG. 4 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S401]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S402].

Meanwhile, if the user equipment initially accesses the base station or fails to have a radio resource for signal transmission, the user equipment is able to perform a random access procedure (RACH) on the base station [S403 to S406]. For this, the user equipment transmits a specific sequence as a preamble via a physical random access channel (PRACH) [S403] and is then able to receive a response message via PDCCH and a corresponding PDSCH in response to the preamble [S404]. In case of contention based RACH, it is able to perform a contention resolution procedure in addition.

Having performed the above mentioned procedures, the user equipment is able to perform PDCCH/PDSCH reception [S407] and PUSCH/PUCCH (physical uplink shared channel/physical uplink control channel) transmission [S408] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 5:
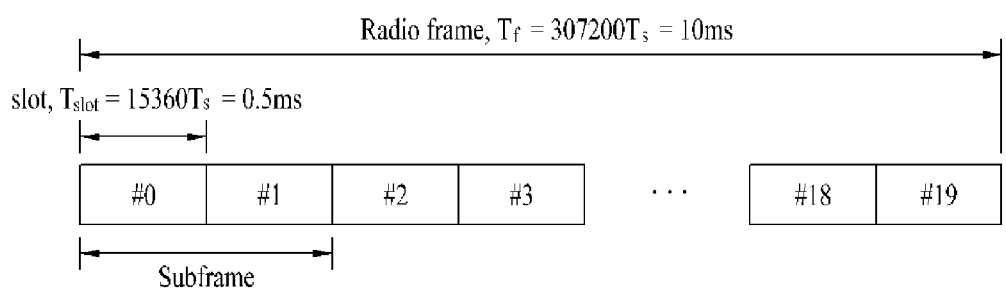
FIG. 5 is a diagram for an example of a structure of a radio frame used for LTE system.

FIG. 5 is a diagram for an example of a structure of a radio frame used by LTE system.

Referring to FIG. 5, a radio frame has a length of 10 ms ($327200 \cdot T_s$) and is constructed with 10 subframes in equal size. Each of the subframes has a length of 1 ms and is constructed with two slots. Each of the slots has a length of 0.5 ms ($15360 \times T_s$). In this case, $T_s$ indicates a sampling time and is expressed as $T_s=1/(15\ \text{kHz} \times 2048)=3.2552 \times 10^{-8}$ (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

In the following description, an RRC state of a user equipment and a corresponding RRC connecting method are explained. In this case, the RRC state means whether an RRC of a user equipment is logically connected to an RRC of E-UTRAN (i.e., logical connection). If the RRCs are connected to each other, it is called an RRC connected state (RRC_CONNECTED). If the RRCs are not connected to each other, it can be called an RRC idle state (RRC_IDLE).

Since E-UTRAN is able to obtain an existence of a user equipment in an RRC connected state by a cell unit, it is able to effectively control the user equipment. On the contrary, the E-UTRAN is unable to obtain a user equipment in an idle state by a cell unit and the corresponding user equipment is managed by a CN by a TA unit that is an area unit greater than a cell. In particular, in order to receive such a service as voice and data from a cell, a user equipment in an RRC idle state should make a transition to an RRC connected state.

Especially, when a user initially turns on a power of a user equipment, the user equipment searches for an appropriate cell and then stays in an RRC idle state at the corresponding cell. If the user equipment staying in the RRC idle state needs to establish an RRC connection, it makes a transition to an RRC connected state by performing an RRC connection establishment process. In particular, if the RRC connection needs to be established, it means the case that an uplink data transmission is necessary due to user's call attempt or the like or the case that a response message needs to be sent in case of receiving a paging message from the E-UTRAN.

Figure 6:
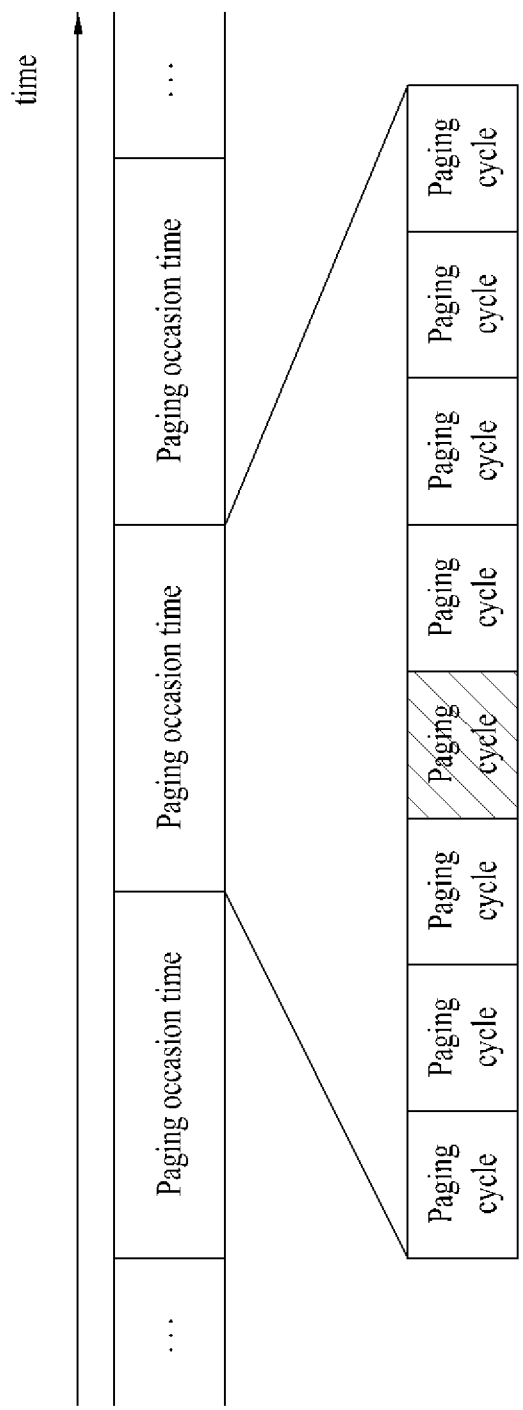
FIG. 6 is a diagram for explaining a general transceiving method using a paging message.

FIG. 6 is a diagram for explaining a general transceiving method using a paging message.

Referring to FIG. 6, a paging message contains a paging cause and a paging record including a UE identity and the like. When the paging message is received, a user equipment is able to perform a discontinuous reception (DRX) for the purpose of power consumption reduction.

In particular, a network configures several paging occasions (POs) for each time cycle called a paging DRX cycle to enable a specific user equipment to obtain a paging message by receiving a specific paging occasion only. The user equipment does not receive a paging channel in a time except the specific paging occasion and is able to stay in a sleep mode to reduce power consumption. And, one paging occasion corresponds to one TTI.

A base station and a user equipment use a paging indicator (PI) as a specific value indicating a transmission of a paging message. The base station defines a specific identity (e.g., paging-radio network temporary identity: P-RNTI) for a usage of the PI and is then able to inform the user equipment of the paging information transmission. For instance, a user equipment wakes up each DRX cycle and then receives one subframe to recognize a presence or non-presence of a paging message. If P-RNTI is contained in L1/L2 control channel (PDCCH) of the received subframe, the user equipment is able to recognize that the paging message exists in PDSCH of the corresponding subframe. If a UE identity (e.g., IMSI) of the user equipment is contained in the paging message, the user equipment makes a response (e.g., RRC connection, system information reception, etc.) to the base station and is then able to receive a service.

In the following description, system information is explained. First of all, the system information should contain necessary information a user equipment should be aware of to access a base station. Therefore, the user equipment should receive all system information before accessing the base station and should have latest system information all the time. Since all user equipments in a cell should be aware of the system information, the base station periodically transmits the system information.

System information can be divided into MIB (Master Information Block), SB (Scheduling Block) and SIB (System Information Block). The MIB enables a user equipment to recognize such a physical configuration of a corresponding cell as a bandwidth and the like. The SB indicates such transmission information of SIBs as a transmission cycle and the like. In this case, the SIB is an aggregate of system informations related to each other. For instance, a specific SIB contains information of a neighbor cell only and another SIB just contains information of a UL radio channel used by a user equipment.

In the following description, a cell selection process and a cell reselection process are explained.

First of all, if a power of a user equipment is turned on, the user equipment selects a cell of an appropriate quality and should perform preparation procedures to receive a service. A user equipment in an RRC idle state selects a cell of an appropriate quality and should be then prepared for being provided with a service through the selected cell al the time. For instance, if a power of a user equipment is turned on just at the moment, the user equipment should select a cell of an appropriate quality to register with a network. Once the user equipment in the RRC connected state enters an RRC idle state, the corresponding user equipment should select a cell to stay in the RRC idle state. Thus, a process for a user equipment to select a cell, which meets a specific condition, to stay in such a service standby state as an RRC idle state is called a cell selection. Since a user equipment performs a cell selection while failing in determining a cell to stay in an RRC idle state, it is very important to select a cell as quickly as possible. Hence, if a cell provides a radio signal quality over a predetermined level, although this cell does not provide a best radio signal quality to a user equipment, the corresponding cell may be selected in the course of a cell selecting process performed by the user equipment.

Once a user equipment selects a cell succeeding in meeting a cell selection reference, the user equipment obtains information required for an operation of the user equipment in an RRC idle state in the corresponding cell from system information of the corresponding cell. After the user equipment has receives all the information required for the operation of the user equipment in the RRC idle state, the user equipment stand by in the RRC idle state to make a request for a service to a network or to receive a service from the network.

After a user equipment has selected a prescribed cell by the cell selecting process, a strength or quality of a signal between the user equipment and a base station may change due to mobility of the user equipment, a radio environment fluctuation and the like. Therefore, if the quality of the selected cell is degraded, the user equipment may be able to select another cell that provides a better quality. Thus, if a cell is reselected, a cell capable of providing a signal quality better than that of a currently selected cell is selected in general. This process is called a cell reselection. In aspect of a quality of a radio signal, the basic object of this cell reselecting process is to select a cell that provides a best quality to a user equipment in general. Beside the aspect of the radio signal quality, a network determines a priority for each frequency and may be then inform a user equipment of the determined priority. Having received the determined priority, the user equipment preferentially considers this priority in the cell reselecting process prior to the radio signal quality reference.

In the following description, a random access (RA) process provided by LTE system is explained. First of all, the random access (RA) process provided by the LTE system is classified into a contention based random access procedure and a non-contention based random access procedure. The criterion for discriminating the contention based random access procedure and the non-contention based random access procedure from each other is determined by whether a random access preamble used in the random access procedure is selected by a user equipment directly or by a base station.

In the non-contention based random access procedure, a user equipment uses a random access preamble directly assigned to the user equipment by a base station. Hence, if the base station assigns the specific random access preamble to the user equipment only, the random access preamble is used only by the user equipment but other user equipments do not use the corresponding random access preamble. Hence, since a one-to-one relation is established between the random access preamble and the user equipment using the random access preamble, we can say that there is no collision or contention. In doing so, since the base station is able to know the user equipment having transmitted the random access preamble as son as receives the corresponding random access preamble, it may be efficient.

On the contrary, in the contention based random access procedure, since a user equipment randomly selects a prescribed random access preamble from random access preambles available for the user equipment and then transmits the randomly selected random access preamble, it may be highly probable that a plurality of user equipments use the same random access preamble. Therefore, even if a base station receives a specific random access preamble, the base station may be unable to know which user equipment has transmitted the specific random access preamble.

A user equipment performs a random access procedure in one of: 1) a case that a user equipment performs an initial access due to an absence of an RRC connection with a base station; 2) a case that a user equipment initially accesses a target cell in a handover procedure; 3) a case that performing the random access procedure is requested through a command given by a base station; 4) a case that data in uplink is generated under the circumstance that time synchronization of uplink is not matched or that a designated radio resource used to make a request for a radio resource is not allocated; 5) a case of a recovery procedure in case of a radio link failure or a handover failure; and the like.

Figure 7:
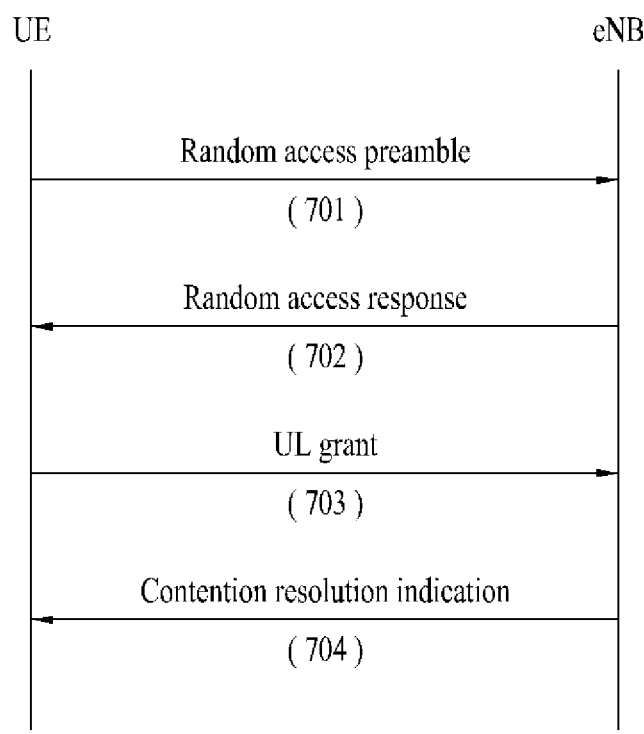
FIG. 7 is a diagram for an operating process between a user equipment and a base station in a contention based random access procedure provided by LTE system.

FIG. 7 is a diagram for an operating process between a user equipment and a base station in a contention based random access procedure provided by LTE system.

Referring to FIG. 7, in a step S701, a user equipment randomly selects one random access preamble from a set of random access preambles indicated through a system information or a handover command, selects a PRACH resource capable of carrying the selected random access preamble, and then transmits the random access preamble on the selected PRACH resource. In this case, the corresponding preamble is called RACH MSG 1.

In a step S702, after the user equipment has transmitted the random access preamble, the base station attempts a reception of its random access response within a random access response receiving window indicated through the system information or the handover command. In particular, RACH MSG 2, i.e., a random access response information is transmitted in format of MAC PDU and the MAC PDU is delivered on PDSCH. In order for the information carried on the PDSCH to be appropriately received by the user equipment, PDCCH is delivered as well. Namely, information on the user equipment supposed to receive the PDSCH, frequency and time information of a radio resource of the PDSCH, a transmission format of the PDSCH and the like may be included in the PDCCH. One the user equipment succeeds in receiving the incoming PDCCH, the user equipment appropriately receives the random access response carried on the PDSCH in accordance with the informations of the PDCCH. In doing so, a random access preamble identifier, a UL grant, a temporary C-RNTI, a time sync correction value (i.e., time alignment command) and the like are included in the random access response. In this case, the reason why the random access preamble identifier is necessary is to indicate that the UL grant, the temporary C-RNTI and the time sync correction value information are useful for which user equipment, because random access response information for at least one or more user equipments may be included in one random access response. And, the random access preamble identifier coincides with the former random access preamble selected by the user equipment in the step S701.

Subsequently, in a step S703, when the user equipment receives the random access response useful for the user equipment, the user equipment handles each of the informations included in the random access response. In particular, the user equipment applies the time sync correction value and saves the temporary C-RNTI. And, the user equipment transmits data saved in its buffer or newly created data to be base station using the UL grant. In dong so, the data (i.e., MAC PDU) transmitted on the UL grant is called RACH MSG 3. In the data included in the UL grant, an identifier of the user equipment should be included. Since the base station is able to determine what kinds of user equipments perform the random access procedure in the contention based random access procedure, user equipments need to be identified to settle the contention or collision in the future. There are two kinds of user equipment identifier including methods. According to a $1^{st}$ method, if a user equipment already has a valid cell identifier previously assigned by a corresponding cell before the random access procedure, the user equipment transmits its cell identifier via the UL grant. On the contrary, if a valid cell identifier is not assigned to the user equipment before the random access procedure, the user equipment transmits its unique identifier. Generally, the unique identifier has a length greater than that of a cell identifier. If the user equipment transmits data via the UL grant, it may initiate a contention resolution timer.

Finally, after the user equipment has transmitted the data containing the identifier of the user equipment via the UL grant included in the random access response, the user equipment waits for an indication for contention resolution from the base station. In particular, the user equipment attempts a reception of PDCCH to receive a specific message. There are two kinds of methods for receiving the PDCCH as well, as mentioned in the foregoing description, if the UE identifier transmitted on the UL grant is a cell identifier, the user equipment attempts a reception of PDCCH using its cell identifier. If the identifier is a unique identifier, the user equipment attempts a reception of PDCCH using a temporary C-RNTI included in the random access response. Thereafter, in the former case, if the user equipment receives the PDCCH (i.e., RACH MSG 4) via its cell identifier before the expiration of the contention resolution timer, the user equipment determines that the random access procedure has been normally performed and then ends the random access procedure. In the latter case, if the user equipment receives the PDCCH via the temporary C-RNTI before the expiration of the contention resolution timer, the user equipment checks the data delivered by the PDSCH indicated by the PDCCH. If the unique identifier of the user equipment is included in the contents of the data, the user equipment determines that the random access procedure has been normally performed and then ends the random access procedure.

Meanwhile, if a channel status between a base station and a user equipment is poor, a relay node (RN) is installed between base station and the user equipment in order to provide a radio channel having a better channel status to the user equipment. In addition, a relay node is introduced to a cell edge region having a poor channel status to provide a high-speed data channel and to extend a cell service area. Thus, the relay node is being widely used to resolve the problem of the propagation shade region in a wireless communication system.

Compared to the conventional relay node having a restricted function of a repeater capable of amplifying and transmitting a signal, the latest relay node technology is being developed to cover more intelligent functions. Moreover, the relay node technology is the technology mandatory to reduce the cost requisite for establishing more base stations and the maintenance cost of a backhaul network in the next generation mobile communication system, to extend the service coverage, and to raise a data processing rate. As the relay node technology tends to be further developed, the necessity for a relay node used in the conventional wireless communication system to be supported by the new wireless communication system is rising correspondingly.

As the technology for forwarding a link connection between a base station and a user equipment is introduced to a relay node in 3GPP LTE-A ($3^{rd}$ Generation Partnership Project Long Term Evolution-Advanced) system, two kinds of links respectively having different attributes are applied to a UL carrier frequency band and a DL carrier frequency band. A connection link established between a base station and a relay node may be represented by being defined into a backhaul link. If a transmission of data is performed by Frequency Division Duplex (FDD) or Time Division Duplex (TDD) using downlink (DL) resources, it may be called a backhaul downlink. If a transmission is performed by FDD or TDD using uplink (UL) resources, it may be called a backhaul uplink.

Figure 8:
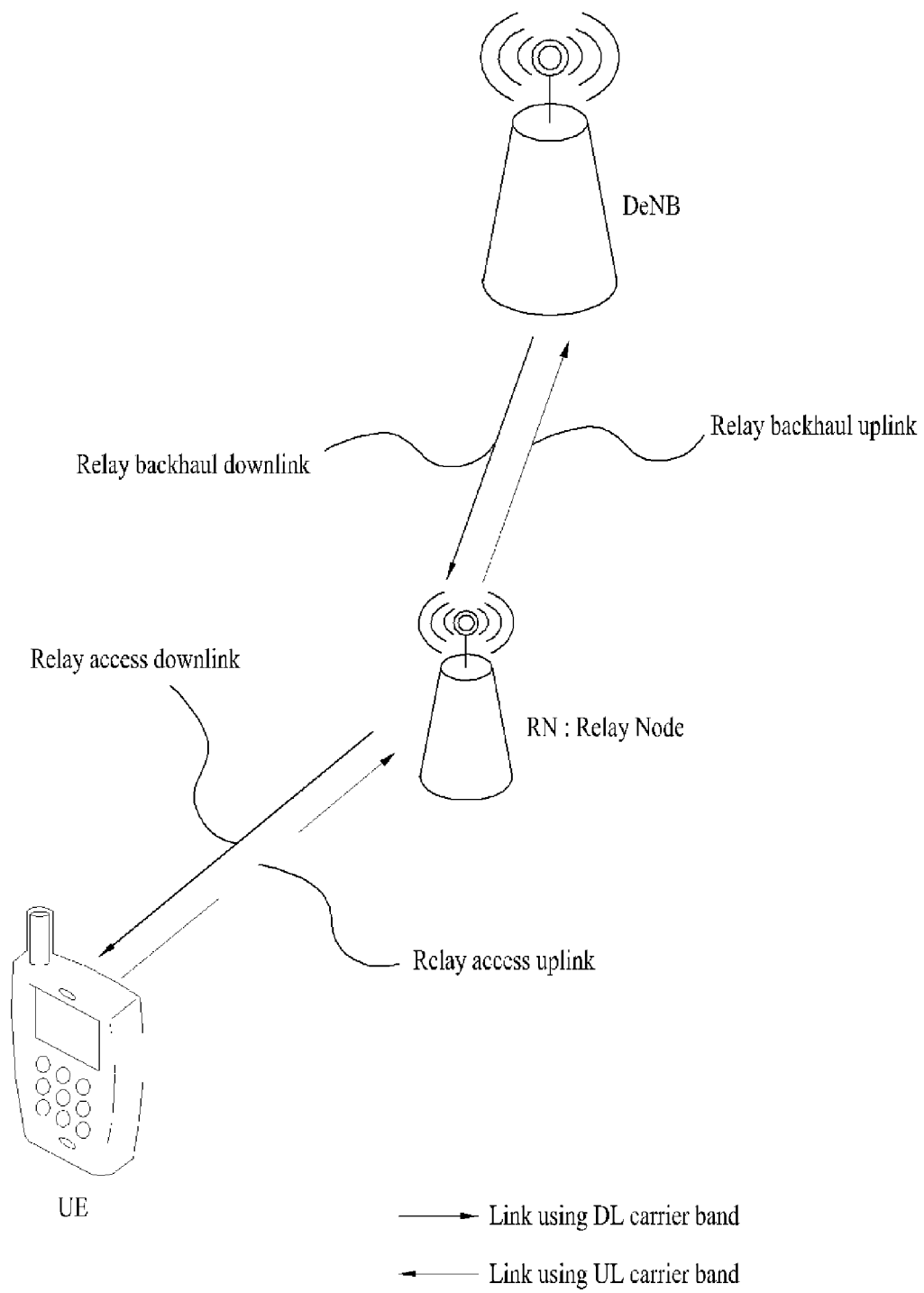
FIG. 8 is a diagram for the concept of a network including a relay node (RN), a base station (DeNB) and a user equipment (UE).

FIG. 8 is a diagram for configurations of a relay backhaul link and a relay access link in a wireless communication system.

Referring to FIG. 8, as a relay node is introduced to play a role in forwarding a link connection between a base station and a user equipment, two kinds of links differing from each other in attributes are applied to a UL carrier frequency band and a DL carrier frequency band, respectively. A connection link part established between the base station and the relay node may be represented by being defined into a relay backhaul link. If a transmission is performed in a manner that a backhaul link uses a DL frequency band resource (e.g., the case of Frequency Division Duplex (FDD)) or a DL subframe resource (e.g., the case of Time Division Duplex (TDD)), it may be represented as a backhaul downlink. If a transmission is performed in a manner that a backhaul link uses a UL frequency band resource (e.g., the case of FDD) or a UL subframe resource (e.g., the case of TDD), it may be represented as a backhaul uplink.

On the other hand, a connection link part established between a relay node (RN) and a series of user equipments may be represented by being defined into a relay access link. If a transmission is performed in a manner that the relay access link uses a downlink frequency band resource (e.g., the case of FDD) or a downlink subframe resource (e.g., the case of TDD), it may be represented as an access downlink. If a transmission is performed in a manner that the relay access link uses an uplink frequency band resource (e.g., the case of FDD) or an uplink subframe resource (e.g., the case of TDD), it may be represented as an access uplink.

A relay node (RN) may be able to receive information from a base station in a relay backhaul downlink and may be able to transmit information to the base station in a relay backhaul uplink. In addition, the relay node may be able to transmit information to the user equipment in a relay access downlink or may be able to receive information from the user equipment in a relay access uplink.

Meanwhile, regarding a use of a band (or spectrum) of a relay node, one case in which a backhaul link operates on the same frequency band of an access link may be referred to as 'in-band', and the other case in which a backhaul link operates on a frequency band different from that of an access link is referred to as 'out-band'. In both of the above-mentioned two cases of the in-band and the out-band, it is necessary for a user equipment (hereinafter named a legacy user equipment) operating in a legacy LTE system (e.g., Release-8) to access a donor cell.

Relay nodes may be classified into a transparent relay node and a non-transparent relay node by depending on whether a user equipment recognizes the relay node. In particular, the 'transparent' may mean a case that a user equipment is unable to recognize whether the user equipment is communicating with a network through a relay node. And, the 'non-transparent' may mean a case that a user equipment is able to recognize whether the user equipment is communicating with a network through a relay node.

Regarding controls of a relay node, relay nodes may be classified into one relay node configured as a part of a donor cell and another relay node capable of controlling a cell by itself.

Although the relay node configured as a part of the donor cell may have a relay node identifier (ID), the relay node does not have a cell identity of its own. If at least one portion of RPM (Radio Resource Management) is controlled by a base station having the donor cell belong thereto (despite that the rest of the RPM is located at the relay node), the above-mentioned relay node may be considered as a relay node (RN) configured as a part of the donor cell. Preferably, this relay node may be able to support a legacy user equipment. For example, smart repeaters, decode-and-forward relay nodes, a variety of L2 (2nd layer) relay nodes, and type-2 relay nodes may belong to the category of the above-mentioned relay node.

Regarding a relay node configured to control a cell by itself, this relay node controls one or more cells, a unique physical layer cell identity is provided to each cell controlled by the relay node, and the same RPM mechanism may be usable. In aspect of a user equipment, there is no difference between accessing a cell controlled by a relay node and accessing a cell controlled by a general base station. Preferably, a cell controlled by the above-mentioned relay node may be able to support a legacy user equipment. For example, a self-backhauling RN, an L3 (3rd layer) relay node, a type-1 relay node, and a type-1a relay node may belong to the category of the above-mentioned relay node.

The type-1 relay node plays a role as an in-band relay node in controlling a plurality of cells, and a user equipment may consider each of the cells as a separate cell discriminated from a donor cell. Moreover, each of a plurality of the cells has a physical cell ID (defined in LTE Release-8) of its own and the relay node may be able to transmit a synchronization channel of its own, a reference signal and the like. In case of a single-cell operation, a user equipment may directly receive scheduling information and HARQ feedback from a relay node and may be able to transmit a control channel (scheduling request (SR), CQI, ACK/NACK, etc.) of its own to a relay node. Moreover, legacy user equipments (e.g., user equipments operating in LTE Release-8 system) may consider the type-1 relay node as a legacy base station (e.g., a base station operating in the LTE Release-8 system). In particular, the type-1 relay node has backward compatibility. Meanwhile, in aspect of user equipments operating in LTE-A system, the type-1 relay node is considered as a base station different from a legacy base station, whereby performance there of can be enhanced.

The type-1a relay node is operated in the out-band, and has the same features as those of the type-1 relay node. Operation of the type-1a relay node may be configured to minimize (or eliminate) the influence on L1 (1st layer) operation.

The type-2 relay node corresponds to an in-band relay node but has no separate physical cell ID not to form a new cell. The type-2 relay node is transparent to a legacy user equipment and the legacy user equipment is unable to recognize the presence of the type-2 relay node. Although the type-2 relay node is able to transmit PDSCH, it may not transmit CRS and PDCCH at least.

Meanwhile, in order for a relay node to operate in in-band, prescribed resources in time-frequency space must be reserved for a backhaul link and these resources may be configured not be used for an access link. This configuration may be called 'resource partitioning'.

The general principles related to the resource partitioning in a relay node may be described as follows. First of all, a backhaul downlink and an access downlink may be multiplexed together on a single carrier frequency by Time Division Multiplexing (TDM) [i.e., either the backhaul downlink or the access downlink is activated in specific time). Similarly, a backhaul uplink and an access uplink may be multiplexed together on a single carrier frequency by TDM [i.e., either the backhaul uplink or the access uplink can be activated in specific time).

Regarding the backhaul link multiplexing by FDD, a backhaul downlink transmission is performed on a downlink frequency band, and a backhaul uplink transmission is performed on an uplink frequency band. Regarding the backhaul link multiplexing by TDD, a backhaul downlink transmission is performed in a downlink subframe of a base station or a relay node, and a backhaul uplink transmission is performed in an uplink subframe of the base station or the relay node.

In case of an in-band relay ode, for example, provided that both a backhaul downlink reception from a base station and an access downlink transmission to a user equipment are simultaneously performed on a prescribed frequency band, a signal transmitted from a transmitting end of a relay node may be received by a receiving end of the relay node, whereby signal interference or RF jamming may occur at an RF front-end of the relay node. Similarly, if both an access uplink reception from a user equipment and a backhaul uplink transmission to a base station are simultaneously performed on a prescribed frequency band, signal interference may occur at the RF front-end of the relay node. Therefore, it may be difficult to implement the simultaneous transmission and reception on a single frequency band at a relay node unless a sufficient separation between a received signal and a transmitted signal is provided [e.g., a transmitting antenna and a receiving antenna are installed in a manner of being sufficiently spaced apart from each other (e.g., installed on or under ground).

As a solution for the above signal interference problem, it may be able to enable a relay node not to transmit a signal to a user equipment wile receiving a signal from a donor cell. In particular, a gap is generated in a transmission from the relay node to the user equipment, and the user equipment (e.g., a legacy user equipment, etc.) may be configured not to expect any transmission from the relay node during this gap. The above-mentioned gap may be generated by constructing MBSFN (Multicast Broadcast Single Frequency Network) subframe.

Figure 9:
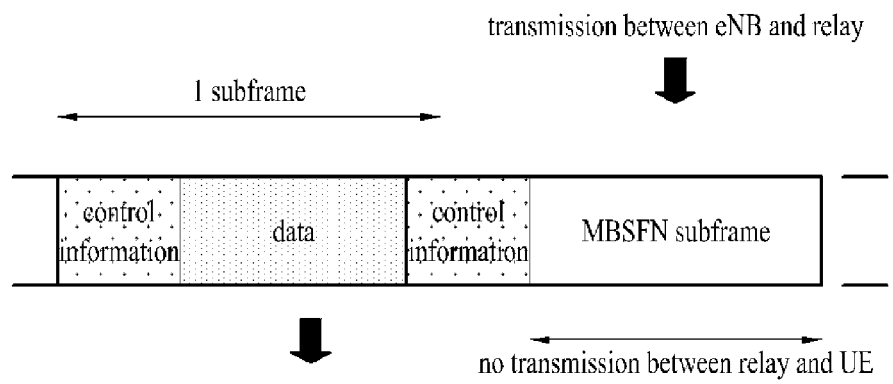
FIG. 9 is a diagram for one example of relay node resource division.

FIG. 9 is a diagram for one example of relay node resource partitioning.

Referring to FIG. 9, in a first subframe that is a normal subframe, a downlink (i.e., an access downlink) control signal and data are transmitted from a relay node to a user equipment. In a second subframe that is an MBSFN subframe, while a control signal is transmitted from the relay node to the user equipment on a control region of a downlink subframe but any transmission from the relay node to the user equipment is not performed in the rest region of the downlink subframe. In dong so, since a legacy user equipment expects a transmission of physical downlink control channel (PDCCH) in all downlink subframes (i.e., the relay node needs to support legacy user equipments within a coverage of the relay node to receive PDCCH in each subframe and to perform a measurement function thereof), it is necessary for the PDCCH to be transmitted in all the downlink subframes in order for each legacy user equipment to operate correctly.

Therefore, in a subframe configured for a downlink (i.e., backhaul downlink) transmission from a base station to a relay node, the relay node needs to perform an access downlink transmission in first N OFDM symbols (N=1, 2 or 3) rather than to receive a backhaul downlink. For this, since PDCCH is transmitted from the relay node to the user equipment in a control region of the second subframe, it may be able to provide backward compatibility with a legacy user equipment served by the relay node. While no signal is transmitted in the rest region of the $2^{nd}$ subframe from the relay node, the relay node may be able to receive a transmission from the base station. Therefore, the above-mentioned resource partitioning scheme can prevent the access downlink transmission and the backhaul downlink reception from being simultaneously performed by the in-band relay node.

The second subframe, which uses the MBSFN subframe, shall be described in detail as follows. First of all, a control region of the second subframe may be referred to as a relay node non-hearing interval. In particular, the relay node non-hearing interval may mean the interval in which a relay node transmits an access downlink signal instead of receiving a backhaul downlink signal. As mentioned in the foregoing description, this relay node non-hearing interval may be configured to have 1-, 2- or 3-OFDM length. In the relay node non-hearing interval, a relay node performs an access downlink transmission to a user equipment and may receive a backhaul downlink from a base station in the rest of the relay node non-hearing interval. In doing so, since the relay node is unable to perform both transmission and reception on the same frequency band, it may take a time to enable the relay node to be switched from a transmitting mode to a receiving mode. Hence, it may be necessary to configure a guard time (GT) to enable the relay node to perform a transmitting/receiving mode switching in first partial interval of a backhaul downlink receiving region. Similarly, even if the relay node operates in a manner of receiving a backhaul downlink from the base station and transmitting and access downlink to the user equipment, it may be bale to configure a guard time (GT) for the transmitting/receiving mode switching of the relay node. The length of the guard time may be defined as a value in time domain. For example, the length of the GT may be defined as k time samples (Ts) (where, k≥1) or may be set to the length of at least one or more OFDM symbols. Alternatively, in case that relay node backhaul downlink subframes are contiguously configured or in accordance with a prescribed subframe timing alignment relation, the guard time of a last part of a subframe may be defined or may not configured. In order to maintain backward compatibility, this guard time may be defined only in a frequency domain configured for a backhaul downlink subframe transmission (i.e., a legacy user equipment is not supportable if a guard time is configured in an access downlink interval). In the backhaul downlink receiving interval except the guard time, the relay node may be able to receive relay node dedicated PDCCH and PDSCH from the base station. In the meaning of a relay node dedicated physical channel, the PDCCH and the PDSCH may also be represented as Relay-PDCCH (R-PDCCH) and R-PDSCH (Relay-PDSCH), respectively.

Although a relay node (RN) operates in a manner of similar to that of a user equipment (UE) in aspect of a base station, it may operate in a manner similar to that of the base station in aspect of the user equipment (UE). Hence, the RN occupies resources, which can be provided by the base station, more than those for the UE. When an operator establishes a cell, it may configure a DeNB cell list accessible by the RN (i.e., list of preconfigured DeNBs). This DeNB cell list may be saved in an OAM (operation and maintenance) server, an MME (mobility management entity), or the like.

Moreover, in a $1^{st}$ phase for the RN to operate in UE mode, the DeNB cell list is delivered to the RN from a target cell that performs a random access procedure. Thereafter, in a $2^{nd}$ phase, the RN may be able to access a DeNB belonging to the list or a cell belonging to the DeNB only. Yet, the DeNB providing the list in the $1^{st}$ phase or the cell belonging to this DeNB may be different from the DeNB accessed by the RN in the $2^{nd}$ phase or the cell belonging to this DeNB. The latter DeNB or the cell belonging to the latter DeNB is not provided with a method for recognizing information on the list.

If an RN makes a handover into a $2^{nd}$ DeNB from a $1^{st}$ DeNB, it is unable to know whether the $2^{nd}$ DeNB is included in the DeNB cell list accessible by the RN. Hence, it may be impossible for the $1^{st}$ DeNB to transmit a command for the RN to make a handover into the $2^{nd}$ DeNB. If possible, it may cause an unnecessary resource waste unless the $2^{nd}$ DeNB is the RN accessible DeNB.

If an RRC connection between the RN and the $1^{st}$ DeNB is cancelled and the RN makes a transition to an RRC idle state, a specific cell of the $1^{st}$ DeNB should provide the RN with information on an access to a cell of the $1^{st}$ DeNB or a cell of another DeNB, i.e., redirection information. In this case, since the $1^{st}$ DeNB is unable to know the information on the RN accessible DeNB cell list, it may cause a problem that the $1^{st}$ DeNB is unable to configure the redirection information for the RN.

Therefore, in order to solve the above problem, the present invention provides a method of providing the $1^{st}$ DeNB with the RN accessible DeNB cell list.

Figure 10:
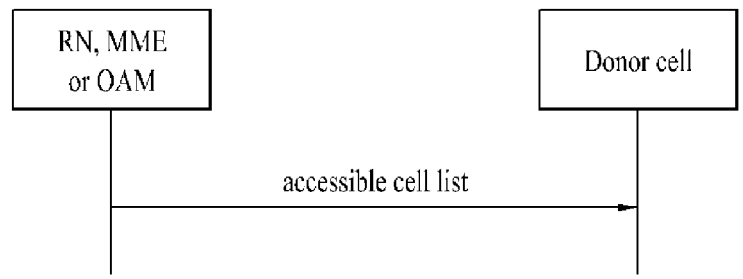
FIG. 10 is a diagram for a method of providing an RN accessible DeNB cell list to DeNB according to an embodiment of the present invention.

FIG. 10 is a diagram for a method of providing an RN accessible DeNB cell list to DeNB according to an embodiment of the present invention.

First of all, when an operator establishes a cell, the operator configures an RN accessible DeNB cell list and may be then able to save the list in such a network node as MME, OAM server and the like. Therefore, in response to a request made by a DeNB or under a preset condition, the MME or the OAM server may be able to transmit the RN accessible DeNB cell list to the DeNB. In particular, the DeNB may be able to receive a delivery of the DeNB cell list from the MME in the course of establishing an S1 connection for the RN using an S1 application (S1Ap) signaling message. Alternatively, the DeNB cell list may be delivered to the DeNB in the course of a handover from another eNB using an X1 application (X1AP) signaling message. In particular, the DeNB delivers such information as a cell identity of the RN to the network node. Subsequently, the network node may be then able to deliver the DeNB cell list corresponding to the cell identity of the RN in the previously saved information to the DeNB.

Meanwhile, it may be able to consider a method of receiving an RN accessible DeNB cell list from an RN. In this case, the RN accessible DeNB cell list may be transmitted to the DeNB from the RN using one of an RRC message on a UL dedicated control channel (UL DCCH), an NAS message on the UL DCCH, an X1 application signaling message on UL DCCH or UL dedicated traffic channel (UL DTCH) and an S1 application signaling message.

In particular, if the DeNB cell list is delivered using the RRC message, the RRC message delivered to the DeNB by the RN may include an RRC connection request message or an RRC connection setup complete message. Alternatively, the RRC message delivered to the DeNB by the RN may include an RRC connection re-establishment complete message in a radio link failure (RLF) recovering process or an RRC connection reconfiguration complete message in a handover process.

In the following description, a communication procedure, which can be implemented in a manner of transmitting an RN accessible DeNB cell list of the present invention to a DeNB, shall be explained by taking an example.

Figure 11:
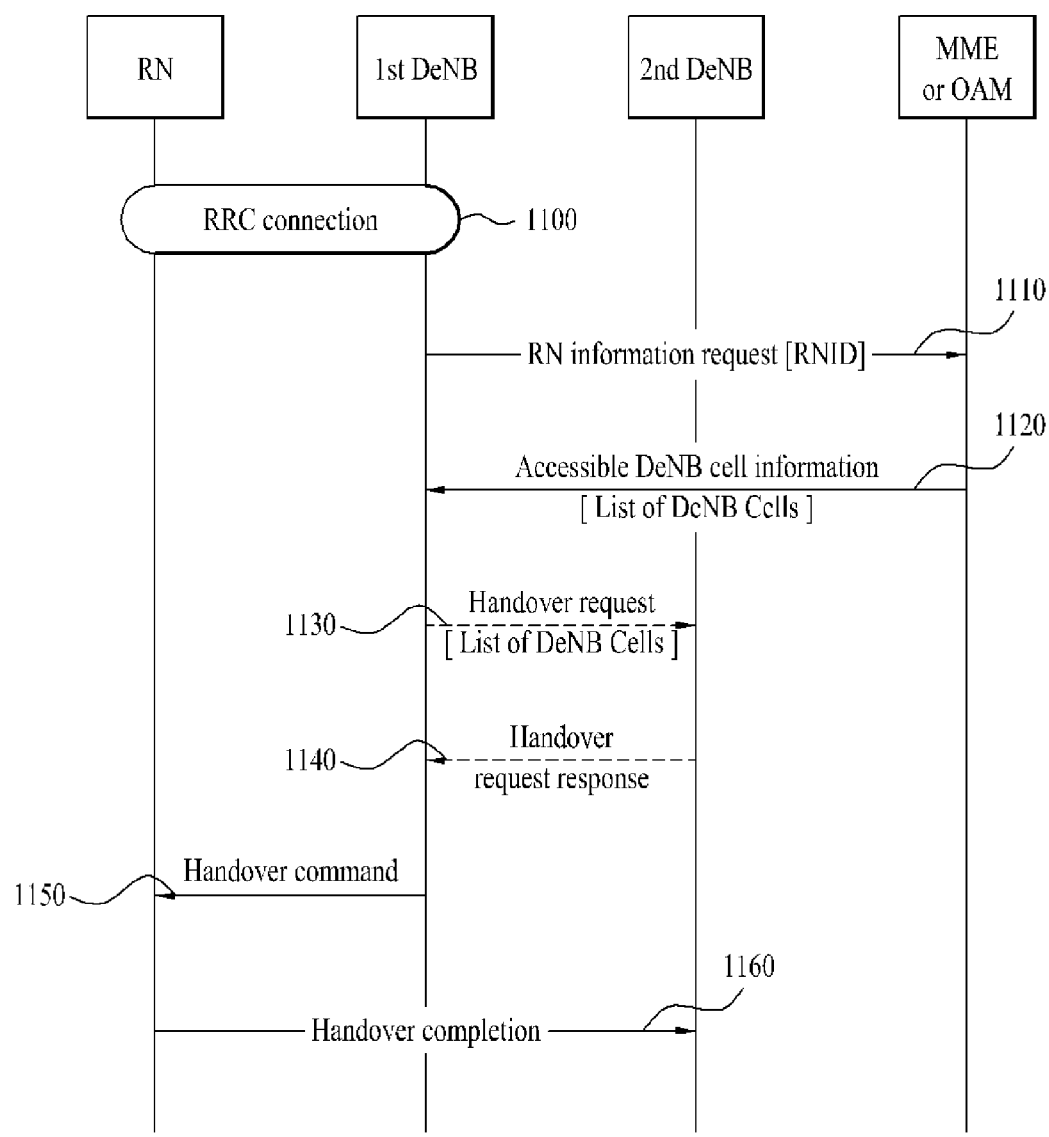
FIG. 11 is a flowchart for one example of a procedure for DeNB to enable RN to make a handover into a different DeNB using an accessible DeNB list according to an embodiment of the present invention.

FIG. 11 is a flowchart for one example of a procedure for a DeNB to enable an RN to make a handover into a different DeNB using an accessible DeNB list according to an embodiment of the present invention. Especially, for clarity of the following description, a serving DeNB shall be named a $1^{st}$ DeNB and a target DeNB shall be named a $2^{nd}$ DeNB.

Referring to FIG. 11, assume that an RN and a $1^{st}$ DeNB are in an RRC connected state, as shown in a step 1100. In dong so, as mentioned in the foregoing description, the $1^{st}$ DeNB makes a request for information of the RN to an OAM server or an MME in a step 1110. In particular, the RN information request may be implemented in a manner of delivering a cell identifier of the RN. In a step 1120, the OAM server or MME delivers a response message to the $1^{st}$ DeNB. In this case, an accessible DeNB cell list corresponding to the cell identifier of the RN may be contained in the response message. Moreover, as mentioned in the foregoing description, the response message may include an S1 application signaling message or an OAM signaling message.

Subsequently, in a step 1130, the $1^{st}$ DeNB having received the accessible DeNB cell list transmits a handover request message of the RN to a specific DeNB, i.e., a $2^{nd}$ DeNB, among DeNBs included in the DeNB cell list. In dong so, it may be preferable that the accessible DeNB cell list is included in the handover request message. Moreover, the handover request message may be transmitted via an X1 application signaling message. Having received the handover request message, the $2^{nd}$ DeNB performs such a handover preparation procedure as making a reservation of a resource for a handover of the RN. In a step 1140, the $2^{nd}$ DeNB delivers a handover request response message to the $1^{st}$ DeNB.

In a step 1150, having received the handover request response message from the $2^{nd}$ DeNB, the $1^{st}$ DeNB delivers a handover command to the RN. In a step 1160, the RN performs a procedure for reconfiguring an RRC connection with the $2^{nd}$ DeNB and may be then able to complete the handover procedure by delivering a handover complete message to the $2^{nd}$ DeNB.

Figure 12:
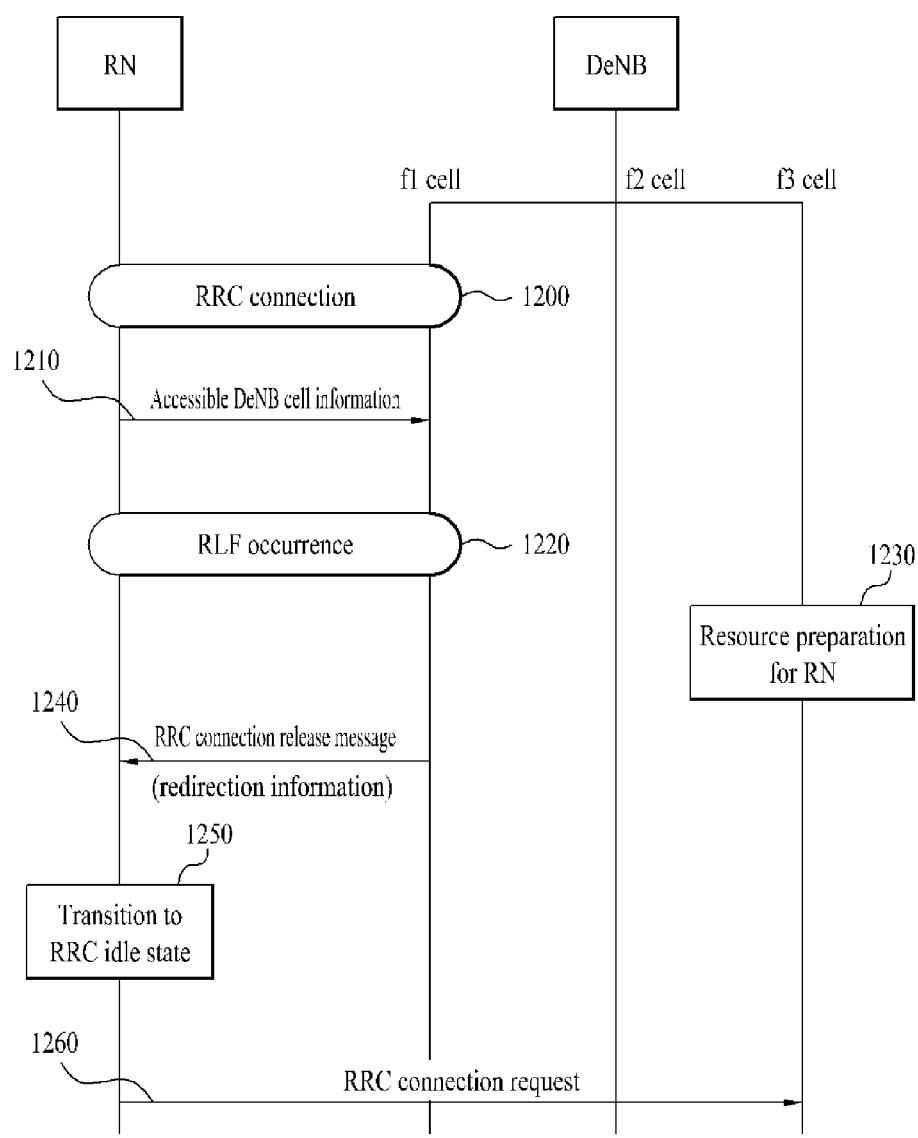
FIG. 12 is a flowchart for one example of a procedure for redirecting RN to a different cell of DeNB in case of occurrence of a radio link failure (RLF) in the course of communication between a specific cell of the DeNB and the RN according to an embodiment of the present invention.

FIG. 12 is a flowchart for one example of a procedure for redirecting RN to a different cell of DeNB in case of occurrence of a radio link failure (RLF) in the course of communication between a specific cell of the DeNB and the RN according to an embodiment of the present invention. Especially, for clarity of the description with reference to FIG. 12, assume that the DeNB is configured with 3 cells (i.e., $f_1$ cell, $f_2$ cell and $f_3$ cell) operating on $f_1$, $f_2$ and $f_3$, respectively, and that the $f_1$ cell and the $f_2$ cell are RN accessible cells only.

Referring to FIG. 12, assume that an RN and an $f_1$ cell are in an RRC connected state in a step 1200. In this case, in a step 1210, the RN may be able to deliver an RN accessible DeNB cell list to the DeNB in response to a request made by the DeNB or in case of an occurrence of a previously set specific condition.

In doing so, in a step 1220, an RLF may occur in a radio link between the RN and the $f_1$ cell. If so, the DeNB confirms that the DeNB is included in the DeNB accessible DeNB cell list and then instructs the $f_3$ cell to prepare a resource for a connection with the RN in a step 1230.

Subsequently, in a step 1240, the $f_1$ cell may be able to deliver an RRC connection release message including redirection information to the RN. In a step 1250, having received the RRC connection release message, the RN enters an RRC idle state. In this case, the redirection information may include identifiers of prescribed cells among a plurality of cells included in the DeNB cell list and information on a frequency or RAT (radio access technology) on which the prescribed cells operate. In this example, cell identifiers of the $f_1$ cell and the $f_3$ cell may be included in the redirection information. In particular, the information on the frequency or RAT of the $f_3$ cell may be included in the redirection information.

Having entered the RRC idle state, in a step 1260, the RN delivers an RRC connection request message to the $f_3$ cell, performs an RRC connection with the $f_3$ cell, and may be then able to enter an RRC connected state.

Figure 13:
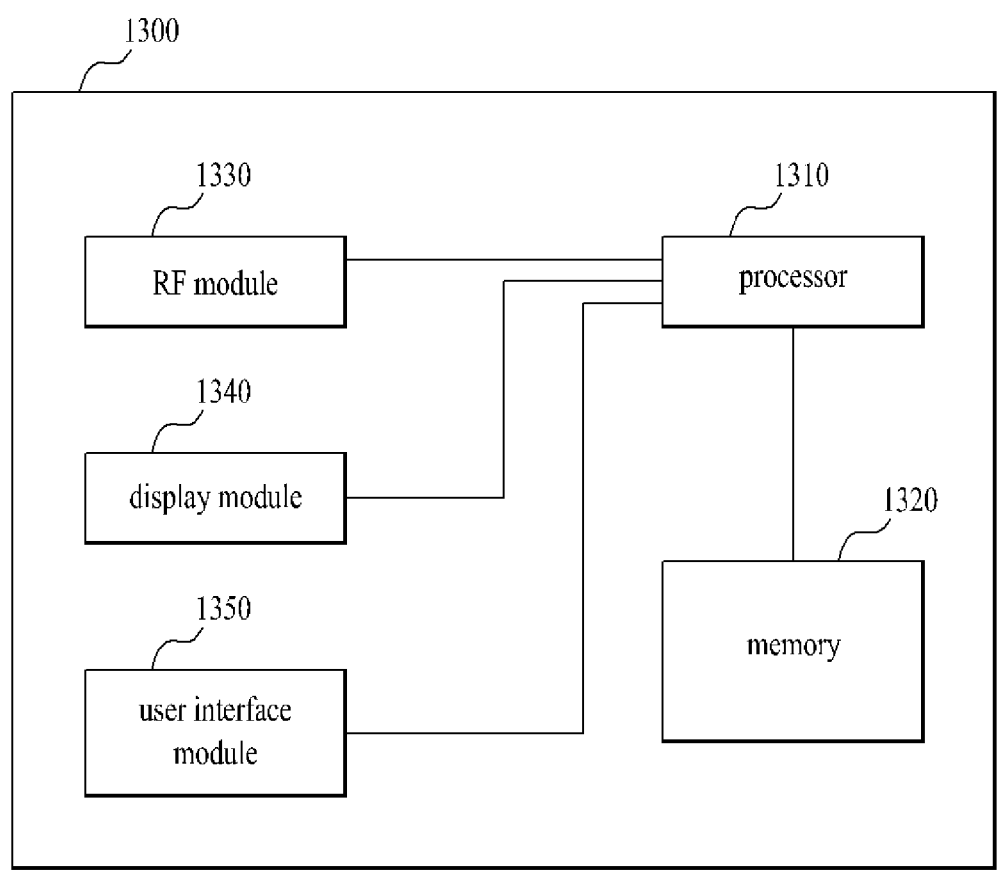
FIG. 13 is a block diagram for one example of a communication device according to one embodiment of the present invention.

FIG. 13 is a block diagram for one example of a communication device according to one embodiment of the present invention.

Referring to FIG. 13, a communication device 1300 includes a processor 1310, a memory 1320, an RF module 1330, a display module 1340 and a user interface module 1350.

The communication device 1300 is illustrated for clarity and convenience of the description and some modules can be omitted. Moreover, the communication device 1300 is able to further include at least one necessary module. And, some modules of the communication device 1300 can be further divided into sub-modules. The processor 1310 is configured to perform operations according to the embodiment of the present invention exemplarily described with reference to the accompanying drawings. In particular, the detailed operations of the processor 1310 can refer to the contents described with reference to FIGS. 1 to 12.

The memory 1320 is connected to the processor 1310 and stores an operating system, applications, program codes, data and the like. The RF module 1330 is connected to the processor 1310 and performs a function of converting a baseband signal to a radio signal or converting a radio signal to a baseband signal. For this, the RF module 1330 performs analog conversion, amplification, filtering and frequency uplink transform or inverse processes thereof. The display module 1340 is connected to the processor 1310 and displays various kinds of informations. The display module 1340 can include such a well-known element as LCD (Liquid Crystal Display), LED (Light Emitting Diode), OLED (Organic Light Emitting Diode) and the like, by which the present invention is non-limited. The user interface module 1350 is connected to the processor 1310 and can include a combination of well-known interfaces including a keypad, a touchscreen and the like.

The above described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In the present disclosure, embodiments of the present invention are described centering on the data transmission/reception relations between a relay node and a base station. In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other network nodes except the base station. In this case, 'base station'can be replaced by such a terminology as a fixed station, a Node B, an eNode B (eNB), an access point and the like.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transceiving an accessible cell information of a relay node in a wireless communication system and apparatus therefor are described mainly with reference to examples applied to 3GPP LTE system, as mentioned in the foregoing description, the present invention is applicable to various kinds of wireless communication systems as well as the 3GPP LTE system.

What is claimed is:

1. A method of processing a signal at a serving network node in a wireless communication system, the method comprising:
   establishing a communication link with a relay node;
   transmitting, to the relay node, a first message requesting network node list information including a list of one or more network nodes with an identifier of the relay node, wherein the one or more network nodes are accessible by the relay node;

receiving, from the relay node, a second message including the network node list information corresponding to the identifier of the relay node; and transceiving the signal with the relay node, wherein the relay node receives the list of one or more network nodes from another network node during a random access procedure before establishing the communication link, wherein if a failure occurs in the communication link between the relay node and the serving network node, the method further comprises transmitting, to the relay node, a release message including redirection information to release the communication link, wherein the redirection information includes information about an identifier of at least one network node of the one or more network nodes, an operating frequency of at least one network node and a RAT (radio access technology) of the at least one network node.

2. The method of claim 1, further comprising:

transmitting a handover request message to a target network node included in the network node list;

receiving a handover request response message from the target network node; and transmitting a handover command message to the relay node, wherein the handover request message includes the network node list information.

3. The method of claim 1, wherein, when the relay node receives the release message, the relay node releases the communication link between the serving network node and the relay node and then transmits a communication link connection request message to the at least one network node.

* * * * *